US009363665B1

(12) United States Patent
Burcham et al.

(10) Patent No.: US 9,363,665 B1
(45) Date of Patent: Jun. 7, 2016

(54) TARGETING INSERTION WORK-AROUND FOR LONG TERM EVOLUTION (LTE) PATH

(71) Applicant: Sprint Communications Company L.P., Overland Park, KS (US)

(72) Inventors: Robert H. Burcham, Overland Park, KS (US); Jason R. Delker, Olathe, KS (US); Geoffrey A. Holmes, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/503,394

(22) Filed: Sep. 30, 2014

(51) Int. Cl.
*H04W 8/22* (2009.01)
(52) U.S. Cl.
CPC ...................................... *H04W 8/22* (2013.01)
(58) Field of Classification Search
CPC ..... H04W 80/04; H04W 28/04; H04W 8/245; H04W 36/30; H04W 36/18
USPC .......... 455/418–420, 436–439; 370/328, 329, 370/331
See application file for complete search history.

(56) References Cited

U.S. PATENT DOCUMENTS

| | | | | |
|---|---|---|---|---|
| 2011/0257960 A1* | 10/2011 | Sathish | ............. | G06F 17/30867 704/9 |
| 2012/0054841 A1* | 3/2012 | Schultz | ................... | G06F 21/44 726/6 |
| 2012/0063405 A1* | 3/2012 | Han | ...................... | H04L 5/0023 370/329 |
| 2012/0311686 A1* | 12/2012 | Medina | ............... | H04L 63/0807 726/7 |
| 2013/0051363 A1* | 2/2013 | Swaminathan | ....... | H04W 48/16 370/331 |
| 2013/0244614 A1* | 9/2013 | Santamaria | ............. | H04L 51/04 455/411 |
| 2014/0089344 A1* | 3/2014 | Hong | ................ | G06F 17/30887 707/772 |
| 2015/0012387 A1* | 1/2015 | Katagiri | .................. | G06Q 30/02 705/26.64 |
| 2015/0044989 A1* | 2/2015 | De Foy | ............... | H04L 12/1478 455/406 |
| 2015/0121065 A1* | 4/2015 | Chen | ..................... | H04L 63/062 713/155 |
| 2016/0029330 A1* | 1/2016 | Siomina | ............ | H04W 56/0055 370/328 |

* cited by examiner

*Primary Examiner* — Cong Tran

(57) ABSTRACT

A method of assigning a subscriber identifier to a mobile communication device using a long term evolution (LTE) network. The method comprises when no subscriber identifier is found and a source internet protocol (IP) address of the original service request is within a predefined IP address block, composing, by the server, a new URL with the original URL nested inside the new URL, wherein the additional part of the new URL from the original URL redirects the mobile communication device to an identifier network element, responding to the original service request, by the server, to a client application on the mobile communication device with the new URL, and referencing, by the identifier network element, a system of record (SoR) for a subscription profile based on a source IP address of a second service request in response to receiving the second service request from the mobile communication device.

20 Claims, 9 Drawing Sheets

TARGETING INSERTION WORK-AROUND FOR LONG TERM EVOLUTION (LTE) PATH

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may be associated with an electronic serial number (ESN), a stock keeping unit (SKU) number, and other identifying information. Mobile telephones and similar electronic/communications devices may be identified by servers with subscriber identifiers, device identifiers, or another type of identifier when requesting the servers for services.

SUMMARY

In an embodiment, a method of assigning a subscriber identifier to a mobile communication device using a long term evolution (LTE) network is disclosed. The method comprises searching an original service request, by a server, for a subscriber identifier of the mobile communication device upon receipt of the original service request comprising an original uniform resource locator (URL). The method further comprises when no subscriber identifier is found and a source internet protocol (IP) address of the original service request is within a predefined IP address block, composing, by the server, a new URL with the original URL nested inside the new URL, wherein the additional part of the new URL from the original URL redirects the mobile communication device to an identifier network element. The method further comprises responding to the original service request, by the server, to a client application on the mobile communication device with the new URL, and referencing, by the identifier network element, a system of record (SoR) for a subscription profile based on a source IP address of a second service request in response to receiving the second service request from the mobile communication device. The method further comprises composing an enhanced header comprising a subscriber identifier obtained from the subscription profile, building a new service request comprising the enhanced header and the original service request, and submitting, by the identifier network element, the new service request to the server as a proxy of the client application.

In an embodiment, a method of assigning a network access identifier to a mobile communication device using a long term evolution (LTE) network is disclosed. The method comprises searching a header of an original service request and a client cookie, by a server, for a network access identifier (NAI) of the mobile communication device upon receipt of the original service request comprising an original uniform resource locator (URL). The method further comprises when no NAI is found and a source internet protocol (IP) address of the original service request is within a predefined IP address block, composing, by the server, a new URL with the original URL nested inside the new URL, wherein the additional part of the new URL from the original URL redirects the mobile communication device to an identifier network element, wherein the additional part of the new URL comprises a canonical name (CNAME) for the identifier network element. The method further comprises responding to the original service request, by the server, to a client application on the mobile communication device with the new URL, and referencing, by the identifier network element, a system of record (SoR) for a subscription profile based on a source IP address of a second service request in response to receiving the second service request from the mobile communication device. The method further comprises composing an enhanced header comprising an NAI obtained from the subscription profile, building a new service request comprising the enhanced header and the original service request, and submitting, by the identifier network element, the new service request to the server as a proxy of the client application. The method further comprises transmitting, by the server, a service response to the identifier network element comprising a client cookie after the server renders the service requested in the original service request based on the NAI of the mobile communication device, wherein the client cookie comprises the NAI. The method further comprises forwarding, by the identifier network element, the service response from the server to the client application, and rendering, by the server, a third service request from the client application based on the NAI comprised in the client cookie, wherein the third service request is received after forwarding the service response to the client application.

In an embodiment, a method of assigning a subscriber identifier to a mobile communication device using a long term evolution (LTE) network is disclosed. The method comprises searching an original service request, by a server, for a subscriber identifier of the mobile communication device upon receipt of the original service request comprising an original uniform resource locator (URL). The method further comprises when no subscriber identifier is found in the original service request and a source internet protocol (IP) address of the original service request is within a predefined IP address block, composing, by the server, a new URL with a portion of the original URL nested inside the new URL, wherein the additional part of the new URL from the original URL redirects the mobile communication device to an identifier network element. The method further comprises responding to the original service request, by the server, to a client application on the mobile communication device with the new URL, and referencing, by the identifier network element, a system of record (SoR) for a subscription profile based on a source IP address of a second service request in response to receiving the second service request from the mobile communication device. The method further comprises composing a name and value pair comprising a subscriber identifier obtained from the subscription profile, composing a redirecting response comprising the name and value pair, wherein the redirecting response redirects the client application to the server, and transmitting the redirecting response to the client application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
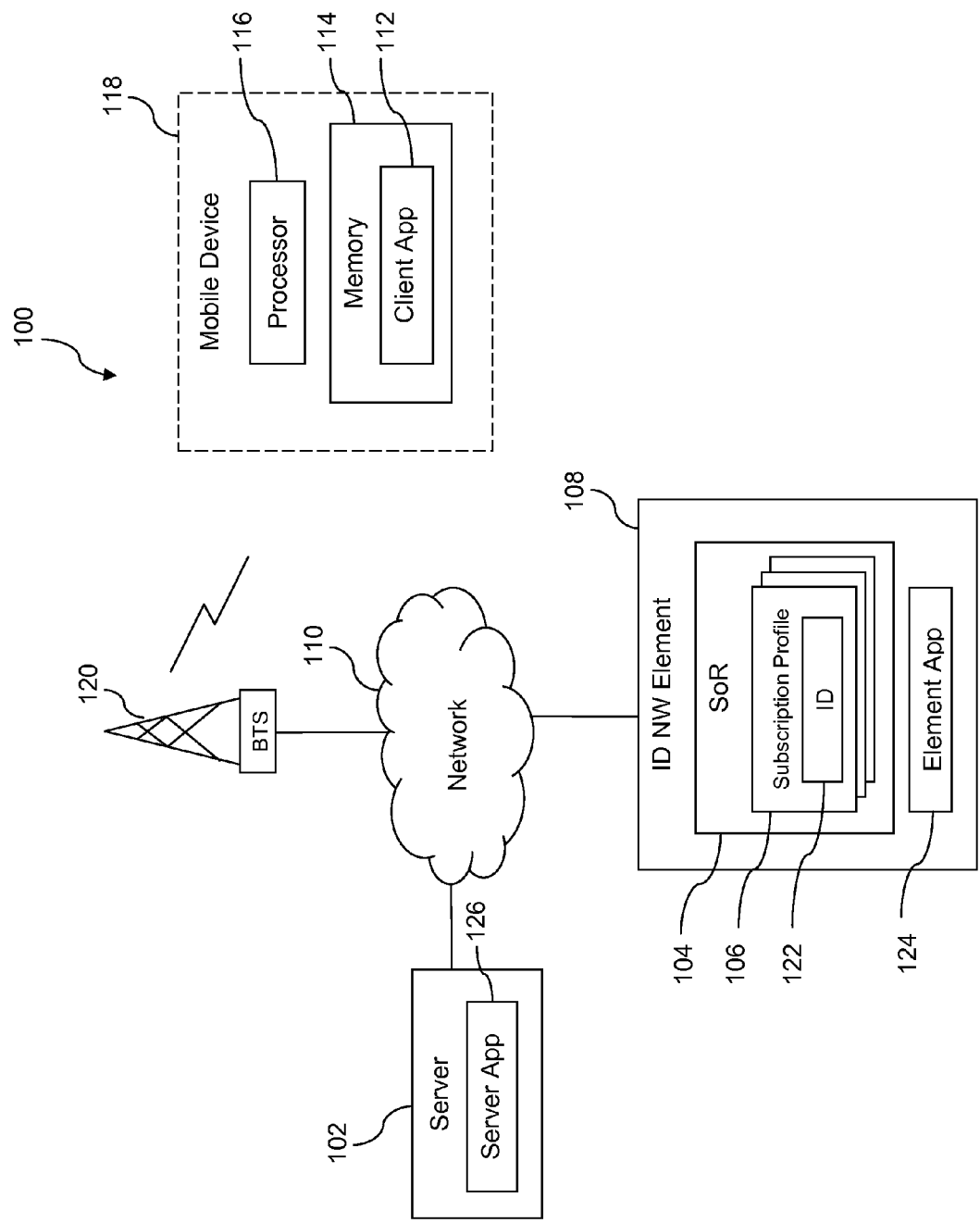
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may occur when mobile communication devices request services without associated identifiers. For example, when a mobile communication device sends a request to a server for a service, the server may desire an identifier of the mobile communication device, for example for identity validation purposes. For example, when the mobile communication device requests the server for premium services compared to services of a baseline level, the server may desire to validate the identity of the mobile communication device and verify that the device is associated with an active subscription for that premium service (i.e., bill is paid up or current) before providing any requested premium service. The present disclosure teaches a system and method for identifying a mobile communication device based on a proxy identity.

For example, when a mobile communication device sends an original service request comprising an original uniform resource locator (URL) to a server, the server may search the original service request for an identifier, for example a subscriber identifier, a device identifier, or another type of identifier. While a subscriber identifier is used throughout as an example and preferred embodiment, it is understood that the teachings of the disclosure may be applied to other types of identifiers for a device or a subscriber of the device. The original service request may be in the form of a hypertext transfer protocol (HTTP) message. When no subscriber identifier is found and a source internet protocol (IP) address of the original service request is within a predefined IP address block, for example an IP address block for long term evolution (LTE) clients, the server may compose a new URL with the original URL nested inside the new URL. For example, the server may compose an HTTP 302 response (i.e., a redirect) with the new URL encapsulating the original URL in a location field. The additional part of the new URL from the original URL redirects the mobile communication device to an identifier network element. When the mobile communication device receives a response from the server comprising the new URL, the mobile communication device may follow the redirecting response and may submit a second service request or a copy of the original service request to the identifier network element.

When the identifier network element receives the second service request from the mobile communication device, an element application on the identifier network element may refer to a system of record (SoR) stored in a memory of the identifier network element to access a subscription profile based on the source IP address of the second service request. The source IP address of the second service request may be the same as the source IP address of the original service request and may be the IP address of the mobile communication device. The IP address of the mobile communication device may be permanent. When a subscription profile is found, the element application may find a subscriber identifier stored in the subscription profile, for example a network access identifier (NAI). The element application may compose an enhanced header with the subscriber identifier. The element application or another application on the identifier network element may compose a new service request, for example in the form of HTTP, to the server. The new service request may comprise the enhanced header and/or at least part of the original service request.

When the server receives the new service request from the identifier network element, the server may determine whether the requested service may be provided based on the subscriber identifier included in the new service request. For example, based on the subscriber identifier, the mobile communication device may be determined to be eligible or ineligible for the requested service. When the mobile communication device is determined to be eligible for the requested service, the server may respond to the identifier network element with a service response. The service response may comprise a header that sets a cookie at the mobile communication device comprising the subscriber identifier. An identifier of the cookie may be computed by the server. Upon receipt of the service response from the server, the identifier network element may forward the service response to the mobile communication device. The mobile communication device may set and/or save the cookie based on the header of the service response from the server. The mobile communication device may save the cookie when it is received. When the mobile communication device later on submits a third service request, the server may locate the subscriber identifier stored in the cookie and may directly render a requested service based on the subscriber identifier when the mobile communication device is determined to be eligible for the requested service.

Alternatively, instead of transmitting a new service request to the server, the identifier network element may compose a redirecting response to the mobile communication device. The redirecting response from the identifier network element may comprise the original service request and/or a name and value pair. For example, the identifier network element may compose an HTTP 302 redirecting response comprising the original service request and/or a name and value pair. The name and value pair may comprise the subscriber identifier. The name and value pair may be encrypted and then composed as a header of the redirecting response, or the redirecting response may be in the form of a hypertext transfer protocol secure (HTTPS) message. The redirecting response may redirect the mobile communication device to the server.

Upon receipt of the redirecting response from the identifier network element, the mobile communication device may follow the redirecting response and submit a third service request or a copy of the original service request to the server comprising the subscriber identifier. The server may render the requested service based on the subscriber identifier and generate a cookie that comprises the subscriber identifier. The server may respond to the mobile communication device with the generated cookie. Upon receipt of the cookie, the mobile communication device may set and/or save the cookie.

A domain name system (DNS) server may assign a canonical name (CNAME) to the identifier network element. The CNAME for the identifier network element assigned by the DNS server may be in the same IP address sub-domain as the server. For example, the server may send a request to the DNS server to request a CNAME for the identifier network element. The reason for the identifier network element to be assigned with a CNAME in the same sub-domain as the server is that when the server composes a cookie as part of a service response to be sent to the identifier network element and then forwarded by the identifier network element to the mobile communication device, the cookie may be determined to be invalid if the cookie is not within the same IP address sub-domain as the server. The identifier network element may also be associated with and/or be located with a different DNS CNAME other than the CNAME within the same sub-domain as the server, for example an original DNS CNAME. Additionally, different servers may request the DNS server to assign different CNAMEs to the identifier network element. For example, a national association for stock car auto racing (NASCAR) pit crew audio streaming server and a Sprint TV streaming server may request a DNS server to assign two different DNS CNAMEs for the identifier network element. Thus, with one IP address, the identifier network element may be associated with multiple DNS CNAMEs.

When the mobile communication device transmits a service request to a server after the cookie is saved, the server may obtain the subscriber identifier from the client cookie and render a requested service based on the subscriber identifier. A client software development kit (SDK) may be modified to build in persistence in client cookies and the client cookies may provide targeting data on requests. While an identifier is used throughout as an example and preferred embodiment, it is understood that the teachings of the disclosure may be applied to other types of validation, for example to verify whether the mobile communication device has paid its service fees. Thus, identifying information may be extracted from and inserted back to service request messages traveling along the LTE call path. Identifying information may also be saved and stored in HTTP cookies at the client side for servers to directly identify an LTE client later on.

Turning now to FIG. 1, a communication system 100 is described. In an embodiment, the communication system 100 comprises a plurality of servers 102, a plurality of mobile communication devices 118, and an identifier network element 108. The mobile device 118 may comprise a processor 116 and a memory 114. The memory may comprise a client application 112. The server 102 may comprise a server application 126. The identifier network element 108 may comprise a system of record (SoR) 104 and an element application 124. The system of record 104 may comprise a plurality of subscription profiles 106. Each subscription profile 106 may comprise an identifier 122, for example a subscriber identifier, a device identifier, or another type of identifier. The mobile device 118 may be configured to use a radio transceiver to establish a wireless communication link with a base transceiver station (BTS) 120, and the base transceiver station 120 may provide communications connectivity of the device 118 to a network 110. The server 102 and the identifier network element 108 may also have access to the network 110. The network 110 may comprise any combination of private and public networks.

It is understood that the system 100 may comprise any number of mobile devices 118, any number of base transceiver stations 120, any number of identifier network elements 108, and any number of servers 102. The collectivity of base transceiver stations 120 may be said to comprise a radio access network, in that these base transceiver stations 120 may provide a radio communication link to the mobile devices 118 to provide access to the network 110. The server 102 may be a server that provides services to mobile communication devices 118, for example video streaming, advertisement subscription, or another type of service. The server 102 may provide premium services that have more add-on features than services at a baseline level to mobile communication devices 118 after validating identities of the mobile communication devices 118. For example, the server 102 may validate the identity of the mobile communication device 118 before providing video streaming at a higher speed than a baseline level of video streaming.

The radio transceiver of the mobile communication device 118 may communicate with the base transceiver station 120 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile device 118 may be any of a mobile phone, a personal digital assistant (PDA), a media player, a laptop computer, a tablet computer, a notebook computer, a wearable computer, a headset computer, or another network/communications capable device. In an embodiment, the mobile communication device 118 may have other components (not shown) such as a near field communication (NFC) radio transceiver, a short range radio transceiver such as a wireless local area network (WLAN) radio transceiver, or other components.

In an embodiment, the server application 126 may be stored in a memory of the server 102. When executed by a processor of the server 102, the server application 126 may perform a variety of functionality to validate the identity of the mobile communication device 118 for rendering requested services. For example, the server application 126 may communicate with the mobile communication device 118 and/or the identifier network element 108 to obtain identity information of the mobile communication device 118 and/or to store identity information at the mobile communication device 118. For example, the server application 126 may search an original service request from the mobile communication device 118, for example from the client application 112 on the mobile communication device 118, for a subscriber identifier 122. The server application 126 may redirect the mobile communication device 118 to the identifier network element 108 to obtain a subscriber identifier 122 of the mobile communication device 118. The server application 126 or another application on the server 102 may respond to a new service request transmitted by the identifier network element 108 as a proxy of the mobile communication device 118. The server application 126 or another application on the server 102 may render the requested service when the identity of the mobile communication device 118 is validated. Additionally, the server application 126 may respond to the mobile communication device 118 by adding a cookie in the response. The cookie may comprise the subscriber identifier 122 obtained from the subscription file 106.

For example, when the mobile communication device 118 sends an original service request to the server 102, the server application 126 may search a variety of locations in the service request for a subscriber identifier 122 of the mobile communication device 118, for example the original service request, a client cookie, or another location. The original service request may be in the form of the hypertext transfer protocol (HTTP), and the mobile communication device 118 may be HTTP compliant. A client cookie may be an HTTP state object that comprises state information or other information related to the client, in this case the mobile communication device 118. State information may comprise previous activity of the client with a server, for example activity of the mobile communication device 118 with the server 102. The cookie may comprise an NAI of the mobile communication device 118. State information stored in the cookie may be transmitted from the server 102 to the mobile communication device 118 and/or transmitted from the mobile communication device 118 to the server 102, for example when the mobile communication device 118 requests service from the server 102. While a subscriber identifier is used throughout as an example and preferred embodiment, it is understood that the teachings of the disclosure may be applied to other types of identifiers for a device or a subscriber of the device.

The server application 126 may examine a source internet protocol (IP) address of the original service request, for example by examining the header of the original service request message. When the source IP address falls within a predefined IP address block, for example an IP address block for long term revolution (LTE) clients, and no subscriber identifier 122 has been found, the server application 126 may compose a new uniform resource locator (URL) with an original URL nested inside the new URL. The original URL may be obtained from the original service request from the client application 112 on the mobile communication device 118. The additional part of the new URL from the original URL may redirect the mobile communication device 118 to the identifier network element 108. The server application 126 may respond to the original service request with a redirecting HTTP response comprising the new URL, for example an HTTP response with a status code of 302.

When the mobile communication device 118 receives the redirecting response from the server 102, the mobile communication device 118 may follow the redirecting response and transmit a second service request to a location specified in the new URL, or an identical service request as the original service request but to a different location that is specified in the new URL, in this case the identifier network element 108.

When a new service request from the identifier network element 108 is received at the server 102, the server application 126 or another application on the server 102 may render a requested service based on the subscriber identifier 122 included in an enhanced header of the new service request. For example, if the mobile communication device 118 is determined to be disqualified to receive the requested service based on the subscriber identifier 122, the server application 126 or another application on the server 102 may not provide the requested service to the mobile communication device 118. On the other hand, if the mobile communication device 118 is determined to be qualified to receive the requested service based on the subscriber identifier 122, the server application 126 or another application on the server 102 may provide the requested service to the mobile communication device 118. The server application 126 or another application on the server 102 may generate an HTTP cookie to transmit to the identifier network element 108 as part of a service response. In an embodiment, an HTTP cookie identifier may be computed by the server 102 based on the subscriber identifier 122. A valid life time for a cookie may be set by the server application 126. For example, if the server 102 provides video streaming services, the valid life time of a cookie generated by the server 102 for the mobile communication device 118 may be a time period of an episode of a television show, a movie, or a sports game. When the server 102 is an advertisement gateway, the valid life time of a cookie generated by the server 102 for the mobile communication device 118 may be a year. When the server 102 is a payment server that verifies whether or not a subscription bill is paid up or current, the valid life time of a cookie may be set for a month, the same as a subscription payment cycle.

The server 102 may respond to the new service request with the cookie attached, for example by setting the cookie in a header of the service response. The service response may be received at the identifier network element 108 and forwarded by the identifier network element 108 to the mobile communication device 118. The client application 112 on the mobile communication device 118 may save the cookie when it is received. When the mobile communication device 118 later on submits a third service request with the cookie attached, the server 102 may locate the subscriber identifier 122 stored in the cookie and may directly render a requested service based on the subscriber identifier 122 when the mobile communication device 118 is determined to be eligible for the requested service.

In an embodiment, the element application 124 may be stored in a memory of the identifier network element 108. When executed by a processor of the identifier network element 108, the element application 124 may perform a variety of functionality to assist in locating and/or assigning a subscriber identifier 122 to a mobile communication device 118. For example, the element application 124 may search the system of record 104 for a corresponding subscription profile 106 based on the source IP address of the second service request from the mobile communication device 118. A subscriber identifier 122 in the subscription profile 106 may be obtained by the element application 124. The element application 124 may compose an enhanced header with the obtained subscriber identifier 122. The element application 124 may build a new service request with the composed enhanced header and the second service request from the mobile communication device 118. Additionally, the element application 124 or the identifier network element 108 may act as a proxy of the mobile communication device 118 and may submit the new service request to the server 102. When the server 102 responds to the identifier network element 108 with a service response, the element application 124 or the identifier network element 108 may forward the service response to the mobile communication device 118.

For example, upon receipt of the new URL from the mobile communication device 118, the element application 124 may reference the system of record 104 for a subscription profile 106 based on the source IP address of the original service request or the second service request. In an embodiment, the source IP address of the original service request and the second service request may be the same. The element application 124 may obtain the source IP address of the original service request by examining the header of the original service request message. The element application 124 may search the system of record 104 for a corresponding subscription profile 106 based on the source IP address of the original service request. For example, each subscription profile 106 may comprise a corresponding IP address of the subscriber. When the source IP address of the original service request and the corresponding IP address of a subscription profile 106 match, the subscription profile 106 may be determined to be the corresponding subscription profile 106 of the mobile communication device 118 that transmitted the original service request. In an embodiment, each mobile communication device 118 may maintain a permanent IP address.

When the corresponding subscription profile 106 is found, the element application 124 may examine the subscription profile 106 for a subscriber identifier 122 that is stored in the subscription profile 106. The element application 124 may compose an enhanced header with the subscriber identifier 122 obtained from the subscription profile 106. For example, the element application 124 may encrypt the subscriber identifier 122 and compose it into an HTTP enhanced header. A new service request comprising the enhanced header and the original service request may be built by the element application 124. The original service request may be obtained by the element application 124 from the second service request, for example by removing the additional part of the second service request from the original service request. The identifier network element 108 may act as a proxy for the mobile communication device 118 and may submit the new service request to the server 102. When the server 102 responds to the identifier network element 108 with a service response, the identifier network element 108 may forward the service response to the mobile communication device 118.

A domain name system (DNS) server may assign a canonical name (CNAME) to the identifier network element 108. The CNAME for the identifier network element 108 assigned by the DNS server may be in the same IP address sub-domain as the server 102. For example, the server 102 may send a request to the DNS server to request a CNAME for the identifier network element 108. The reason for the identifier network element 108 to be assigned with a CNAME in the same IP address sub-domain as the server 102 is that when the server 102 composes a cookie as part of a service response to be sent to the identifier network element 108 and then forwarded by the identifier network element 108 to the mobile communication device 118, the cookie may be determined to be invalid if the cookie is not within the same IP address sub-domain as the server 102. The identifier network element 108 may also be associated with and/or be located with a different DNS CNAME other than the CNAME within the same sub-domain as the server 102, for example an original DNS CNAME. Additionally, different servers 102 may request the DNS server to assign different CNAMEs to the identifier network element 108, for example when the servers 102 are in different DNS domains. For example, a national association for stock car auto racing (NASCAR) pit crew audio streaming server 102 and a Sprint TV streaming server 102 may request a DNS server to assign two different DNS CNAMEs for the identifier network element 108.

Figure 2:
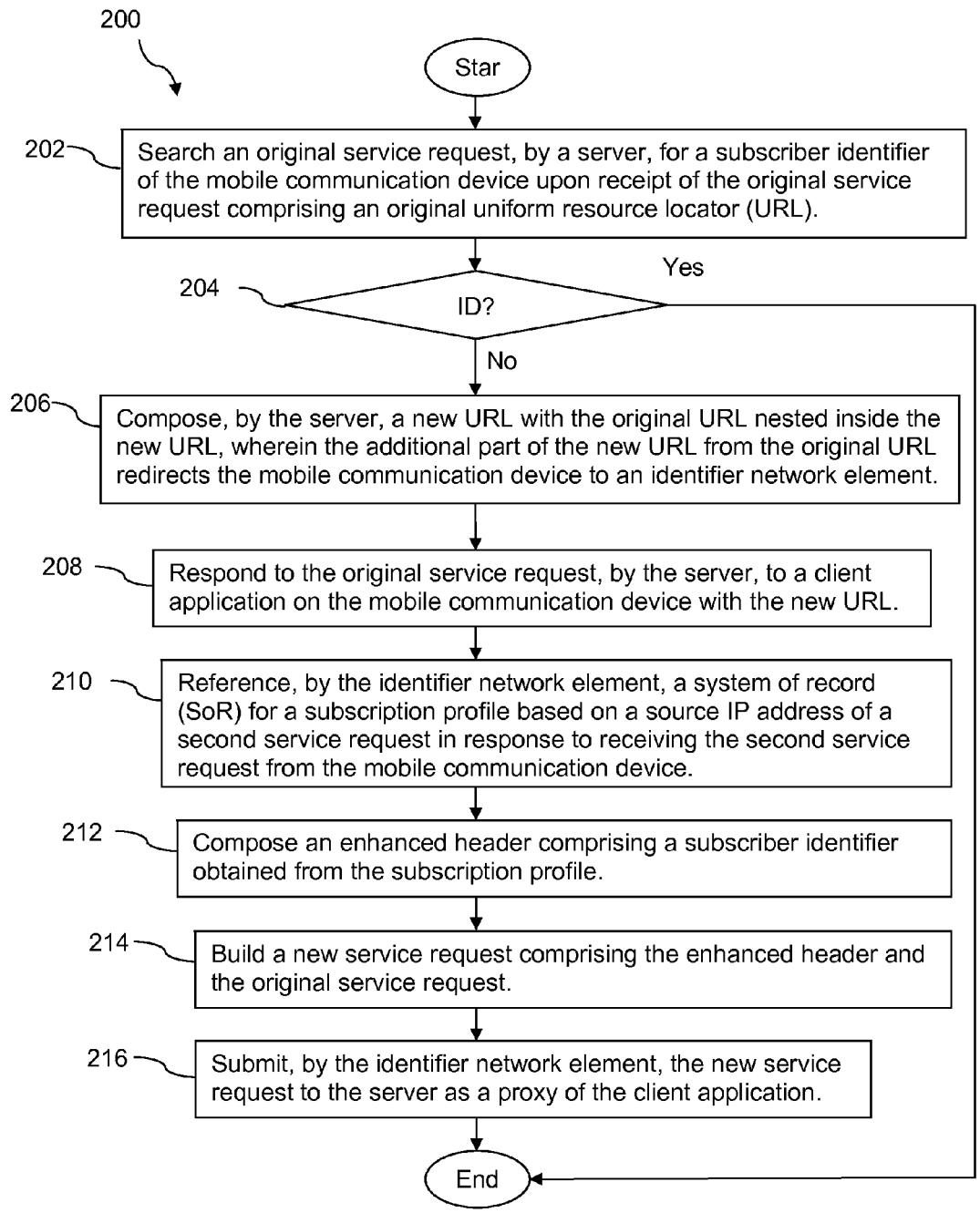
FIG. 2 is a flow chart illustrating a method according to an embodiment of the disclosure.

Turning now to FIG. 2, a method 200 is described. At block 202, an original service request is searched by a server for a subscriber identifier of the mobile communication device upon receipt of the original service request comprising an original uniform resource locator (URL). For example, an original service request from the mobile communication device 118 may be searched by the server 102 for a subscriber identifier 122 of the mobile communication device 118. For example, when no custom header is found in the original service request, then no subscriber identifier may be included in the original service request. The original service request may comprise an original URL that references the server 102 or a service application on the server 102. The service application on the server 102 may be an application that provides services such as audio streaming, video streaming, advertisement promotion, or another type of service.

At block 204, it is determined whether an identifier is found and whether a source IP address of the original service request is within a predefined IP address block. For example, it is determined whether the subscriber identifier 122 is found and whether a source IP address of the original service request is within a predefined IP address block, for example an IP address block for LTE clients. When the result of block 204 is false, which means no subscriber identifier 122 is found and the mobile communication device 118 is an LTE client, the method/process may proceed to block 206. When the result of block 204 is true, which means a subscriber identifier 122 is found or the mobile communication device 118 is not an LTE client, the method 200 may end. A variety of different steps may follow this after the method 200 ends. For example, when a subscriber identifier 122 is found and the mobile communication device 118 is determined to be eligible for the service requested in the original service request, the server 102 may provide the requested service to the mobile communication device 118.

At block 206, a new URL is composed by the server 102 with the original URL nested inside the new URL, wherein the additional part of the new URL from the original URL redirects the mobile communication device 118 to an identifier network element 108. At block 208, the original service request is responded to by the server 102 to a client application 112 on the mobile communication device 118 with the new URL. At block 210, a system of record (SoR) 104 is referenced by the identifier network element 108 for a subscription profile 106 based on a source IP address of a second service request in response to receiving the second service request from the mobile communication device 118.

At block 212, an enhanced header is composed comprising a subscriber identifier 122 obtained from the subscription profile 106. At block 214, a new service request is built comprising the enhanced header and the original service request. At block 216, the new service request is submitted by the identifier network element 108 to the server 102 as a proxy of the client application 112.

Figure 3A:
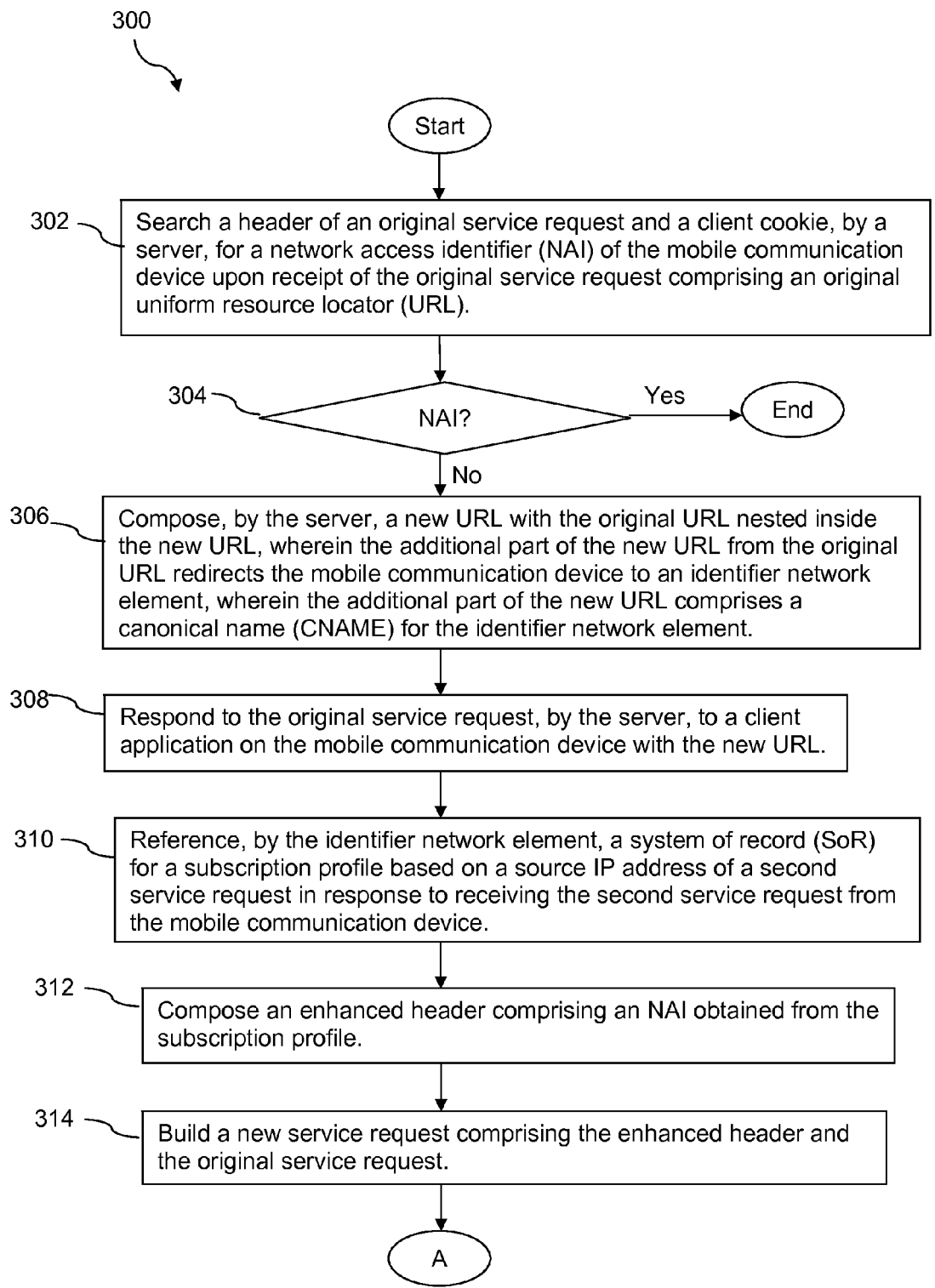
FIG. 3A and FIG. 3B is a flow chart illustrating another method according to an embodiment of the disclosure.
Figure 3B:
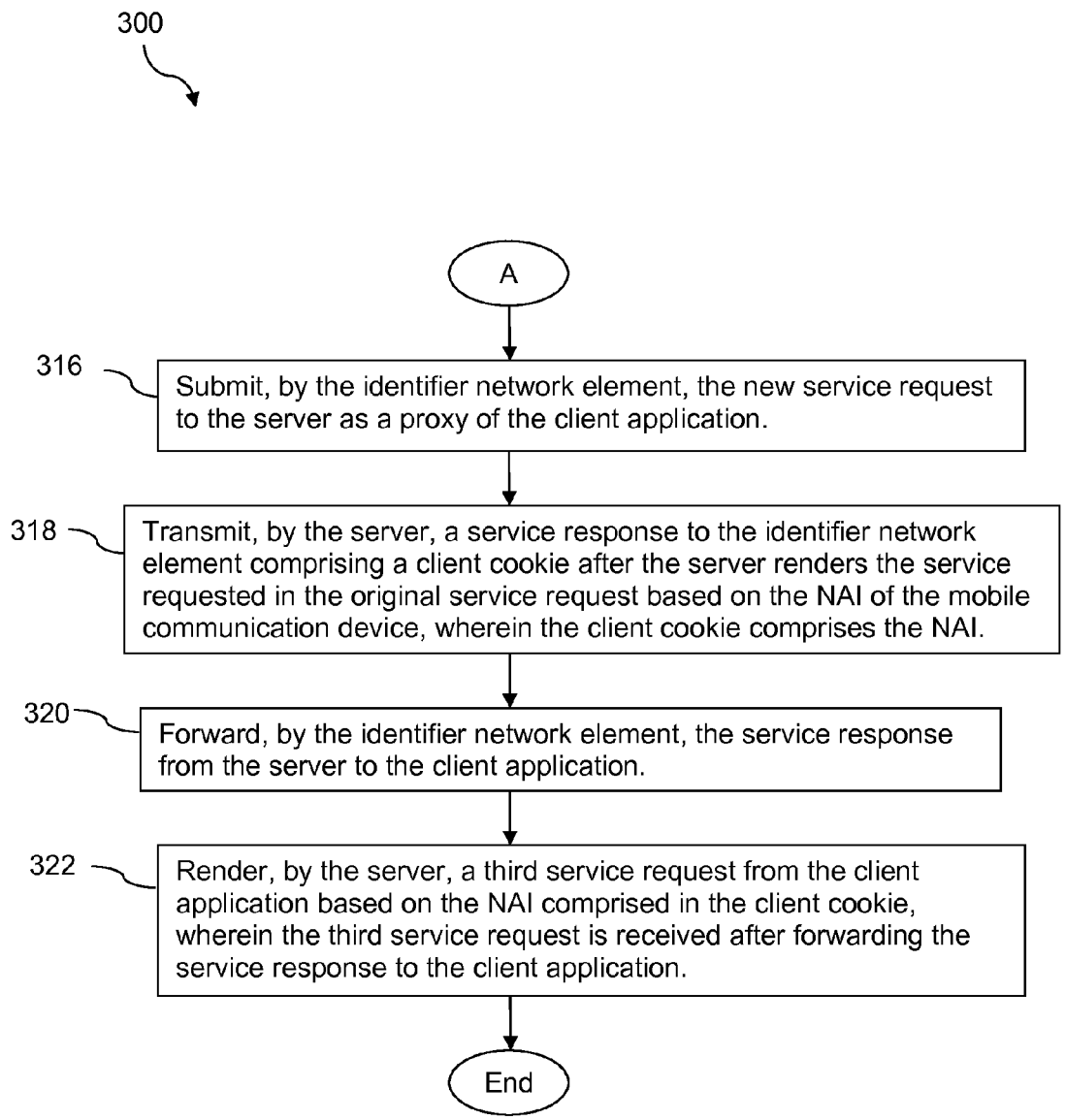

Turning now to FIG. 3A and FIG. 3B, a method 300 is described. At block 302, a header of an original service request and a client cookie are searched by a server for a network access identifier (NAI) of the mobile communication device upon receipt of the original service request comprising an original uniform resource locator (URL). For example, when an original service request is received at the server 102, the header of the original service request and a client cookie at the mobile communication device 118 may be searched by the server 102, for example by the server application 126, for an NAI. An NAI may be utilized to identify a mobile communication device 118 that requests access to a network. The NAI may also be utilized to identity a mobile communication device 118 that requests services from the server 102. The original service request may comprise an original URL.

At block 304, it is determined whether an NAI is found and whether a source IP address of the original service request is within a predefined IP address block. For example, it is determined whether the NAI is found and whether a source IP address of the original service request is within a predefined IP address block, for example an IP address block for LTE clients. When the result of block 304 is false, which means no NAI is found and the mobile communication device 118 is an LTE client, the method/process may proceed to block 306. When the result of block 304 is true, which means an NAI is found or the mobile communication device 118 is not an LTE client, the method 300 may end. A variety of different steps may follow this after the method 300 ends. For example, when an NAI is found and the mobile communication device 118 is determined to be eligible for the service requested in the original service request, the server 102 may provide the requested service to the mobile communication device 118.

At block 306, a new URL is composed by the server 102 with the original URL nested inside the new URL, wherein the additional part of the new URL from the original URL redirects the mobile communication device 118 to an identifier network element 108, wherein the additional part of the new URL comprises a canonical name (CNAME) for the identifier network element 108. For example, a domain name system (DNS) server may assign a CNAME to the identifier network element 108 in response to a request to assign the CNAME. The CNAME for the identifier network element 108 assigned by the DNS server may be in the same IP address sub-domain as the server 102. For example, the server 102 may send a request to the DNS server to request a CNAME for the identifier network element 108. The reason for the identifier network element 108 to be assigned with a CNAME in the same sub-domain as the server 102 is that when the server 102 composes a cookie as part of a service response to be sent to the identifier network element 108 and then forwarded by the identifier network element 108 to the mobile communication device 118, the cookie may be determined to be invalid if the cookie is not within the same IP address sub-domain as the server 102. The identifier network element 108 may also be associated with and/or be located with a different DNS CNAME other than the CNAME within the same sub-domain as the server 102. For example, the identifier network element 108 may have a plurality of CNAMEs, one for each different server 102 that is used in the system 100 described above. Additionally, the identifier network element 108 may have a name, for example a CNAME, that may be considered a native or original name that locates it in a sub-domain that is not associated with any server 102.

At block 308, the original service request is responded to by the server 102 to a client application 112 on the mobile communication device 118 with the new URL. At block 310, a system of record (SoR) 104 is referenced by the identifier network element 108 for a subscription profile 106 based on a source IP address of a second service request in response to receiving the second service request from the mobile communication device 118.

At block 312, an enhanced header is composed comprising an NAI obtained from the subscription profile 106. At block 314, a new service request is built comprising the enhanced header and the original service request. At block 316, the new service request is submitted by the identifier network element 108 to the server 102 as a proxy of the client application 112.

At block 318, a service response is transmitted by the server 102 to the identifier network element 108 comprising a client cookie after the server 102 renders the service requested in the original service request based on the NAI of the mobile communication device 118, wherein the client cookie comprises the NAI.

At block 320, the service response from the server 102 is forwarded by the identifier network element 108 to the client application 112. At block 322, a third service request from the client application 112 is rendered by the server 102 based on the NAI comprised in the client cookie, wherein the third service request is received after forwarding the service response to the client application 112. For example, when the mobile communication device 118 later on submits a third service request, the server 102 may locate the NAI stored in the client cookie and may directly render a requested service based on the NAI when the mobile communication device 118 is determined to be eligible for the requested service.

Figure 4:
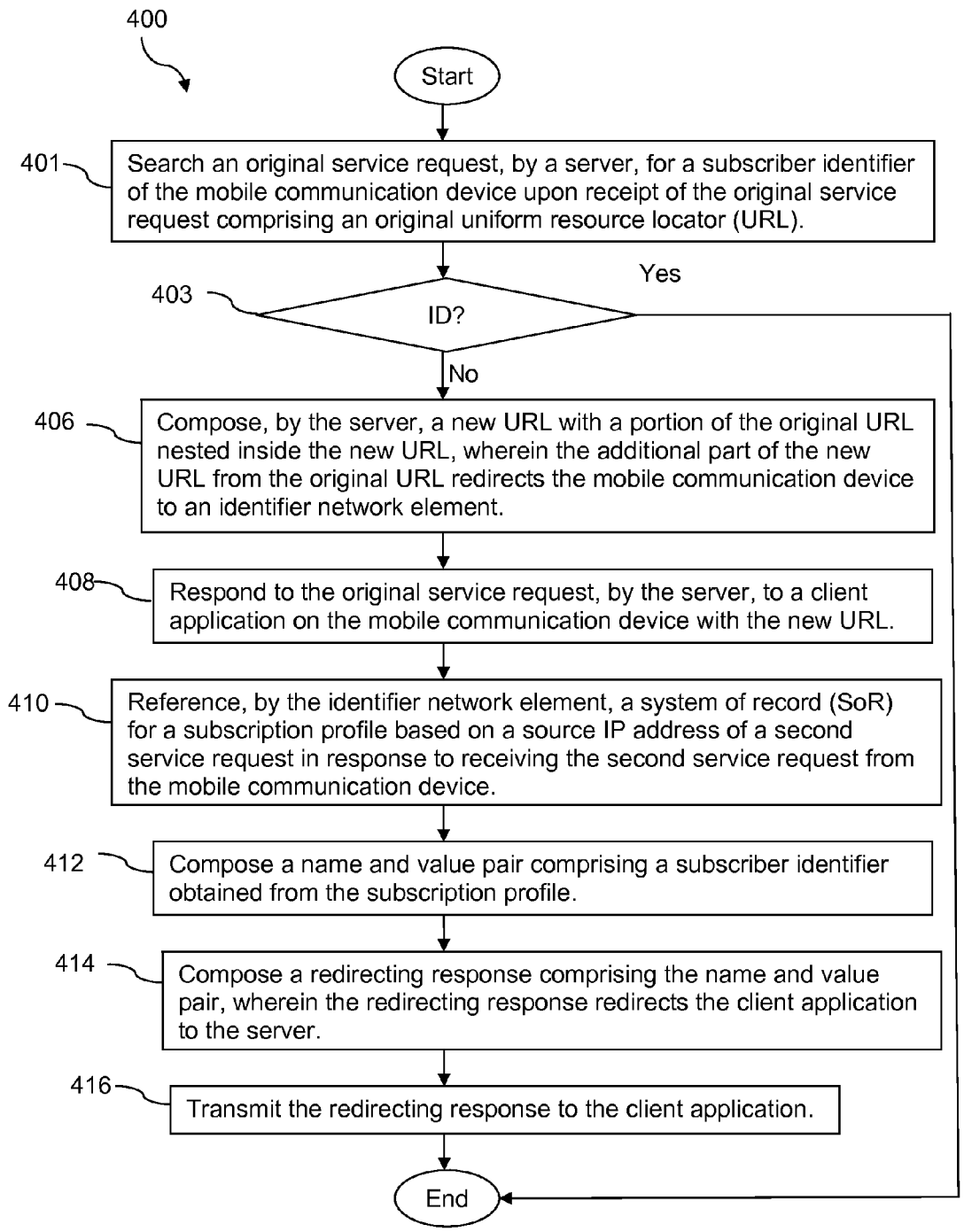
FIG. 4 is a flow chart illustrating a third method according to an embodiment of the disclosure.

Turning now to FIG. 4, a method 400 is described. At block 401, an original service request is searched by a server 102 for a subscriber identifier 122 of the mobile communication device 118 upon receipt of the original service request comprising an original uniform resource locator (URL). At block 403, it is determined whether a subscriber identifier 122 is found and whether a source IP address of the original service request is within a predefined IP address block, for example an IP address block for LTE clients. When the result of block 403 is false, which means no subscriber identifier 122 is found and the mobile communication device 118 is an LTE client, the method/process may proceed to block 406. When the result of block 403 is true, which means a subscriber identifier 122 is found or the mobile communication device 118 is not an LTE client, the method 400 may end. A variety of different steps may follow this after the method 400 ends. For example, when a subscriber identifier 122 is found and the mobile communication device 118 is determined to be eligible for the service requested in the original service request, the server 102 may provide the requested service to the mobile communication device 118.

At block 406, a new URL is composed by the server 102 with a portion of the original URL nested inside the new URL, wherein the additional part of the new URL from the original URL redirects the mobile communication device 118 to an identifier network element 108. For example, at least a portion of the original URL may be nested inside the new URL to form the new URL. For example, a portion of the original URL may be taken by the server 102 to append to a part of a CNAME of the identifier network element 108 to generate the new URL. The additional part of the new URL form the original URL, which comprises at least part of the CNAME of the identifier network element 108, may redirect the mobile communication device 118 to the identifier network element 108.

At block 408, the original service request is responded to by the server 102 to a client application 112 on the mobile communication device 118 with the new URL. For example, the server application 126 on the server 102 may respond to the original service request with a redirecting hypertext transfer protocol secure (HTTPS) response comprising the new URL, for example an HTTPS response with a status code of 302. Upon receipt of the redirecting response from the server 102, the mobile communication device 118 may submit a second service request or a copy of the original service request to the identifier network element 108 whose address is defined by the new URL in the response from the server 102. At block 410, a system of record (SoR) 104 is referenced by the identifier network element 108 for a subscription profile 106 based on a source IP address of a second service request in response to receiving the second service request from the mobile communication device 118.

At block 412, a name and value pair is composed comprising a subscriber identifier 122 obtained from the subscription profile 106. For example, a name and value pair may comprise a subscriber identifier name as the name in the pair and a subscriber identifier 122 as the value. At block 414, a redirecting response is composed comprising the name and value pair, wherein the redirecting response redirects the client application 112 to the server 102. For example, the redirecting response may be composed by appending the name and value pair and/or other elements to the original service request. The original service request may be obtained by the element application 124 from the second service request, for example by removing the additional part of the second service request from the original service request. The redirecting response may be an HTTPS response.

At block 416, the redirecting response is transmitted to the client application 112. When the client application 112 receives the redirecting response from the identifier network element 108, the client application 112 may follow the redirecting response to submit a third service request or a copy of the original service request to the server 102 with the name and value pair obtained from the redirecting response from the identifier network element 108. The server 102 may render a requested service based on the subscriber identifier 122 contained in the name and value pair when the identity of the mobile communication device 118 is determined to be eligible for the service requested. The server 102 may compute an HTTP client cookie based on the subscriber identifier 122. The client cookie may comprise the subscriber identifier 122. The server 102 may directly respond to the mobile communication device 118 with a service response and/or a header with cookie setting information. The mobile communication device 118 may be requested by the cookie settings to set and/or save the cookie comprising the subscriber identifier 122. In an embodiment, at blocks 408 and 414, the redirecting responses may be in the form of HTTPS. Alternatively, the redirecting responses at blocks 408 and 414 may be encrypted instead of being composed in the form of HTTPS, or protected in another form to avoid potential security threats.

Figure 5:
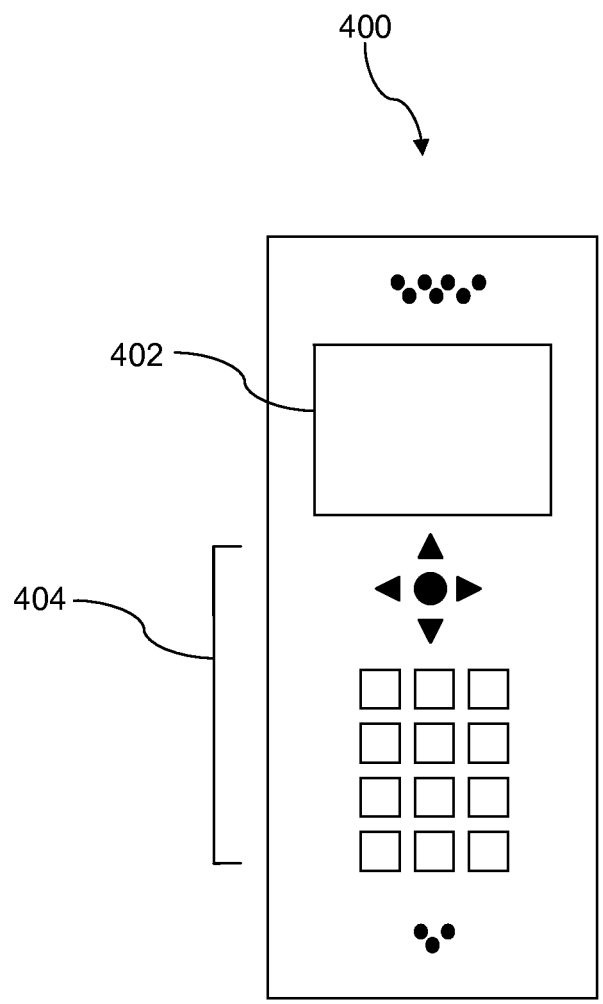
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
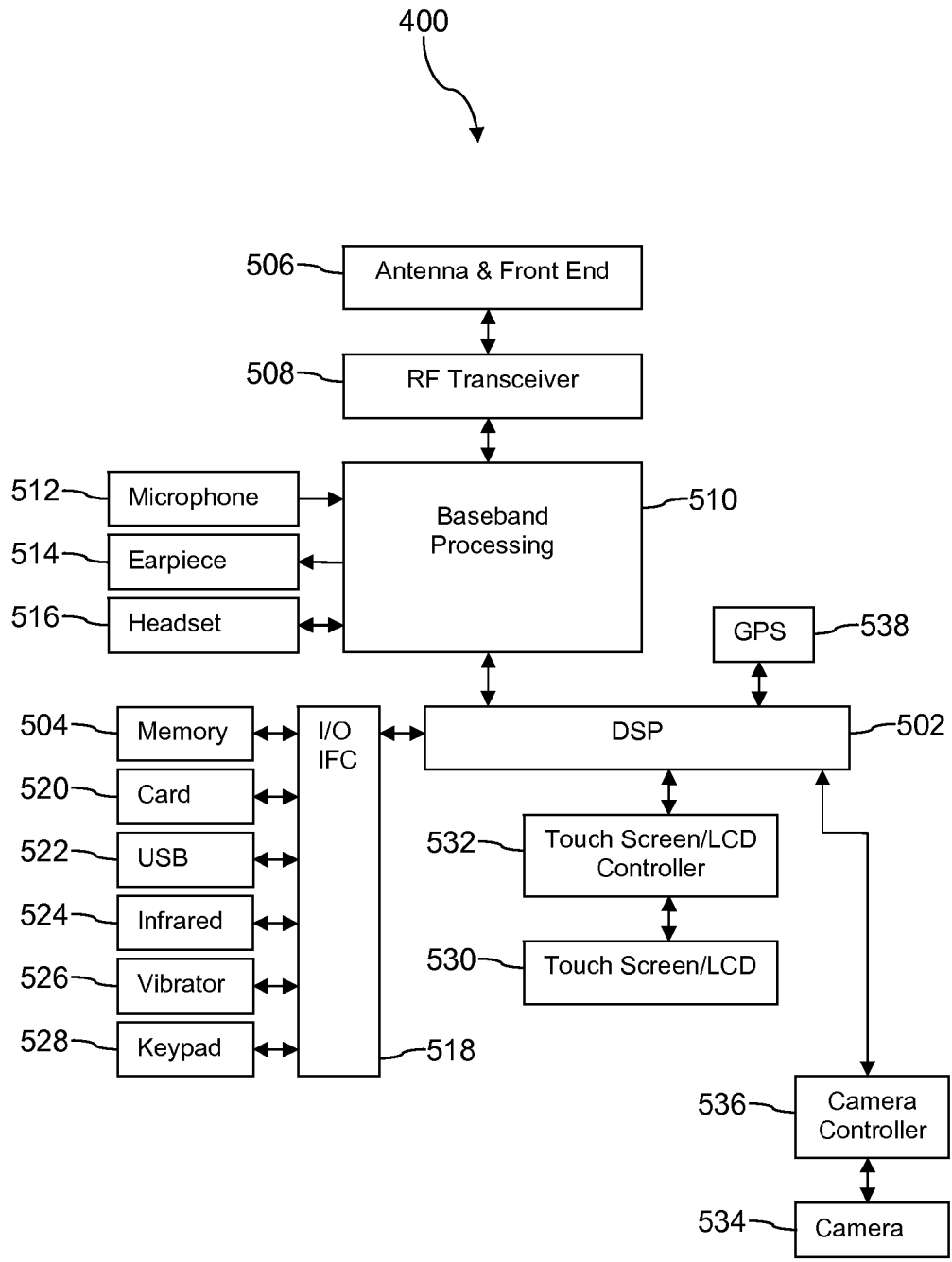
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
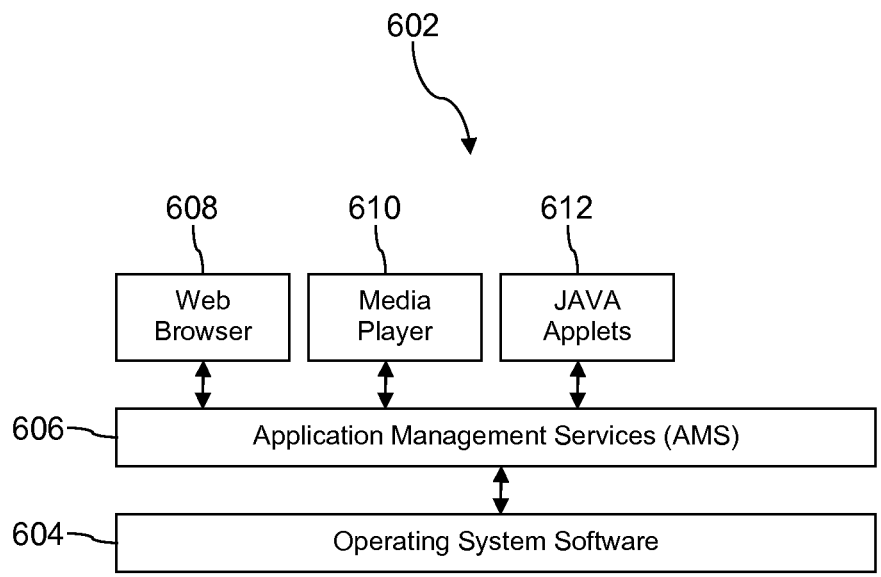
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
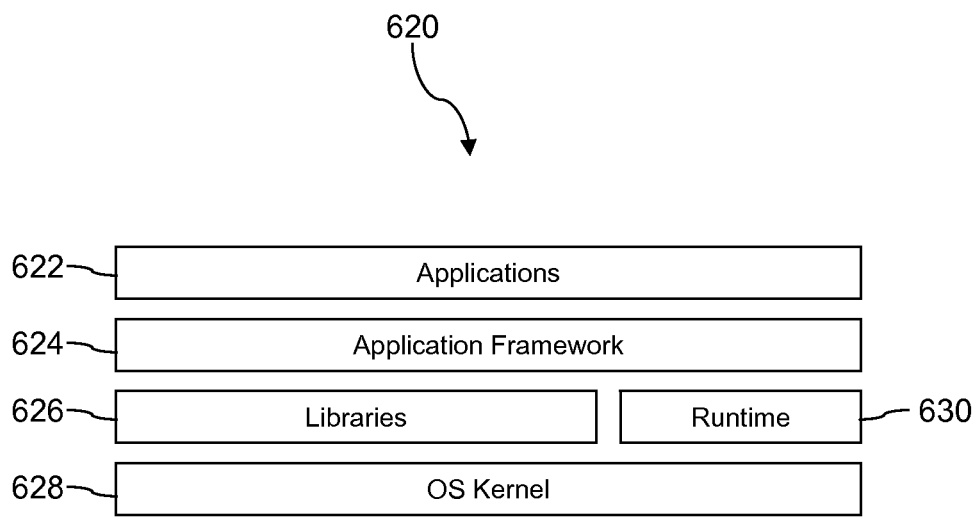
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
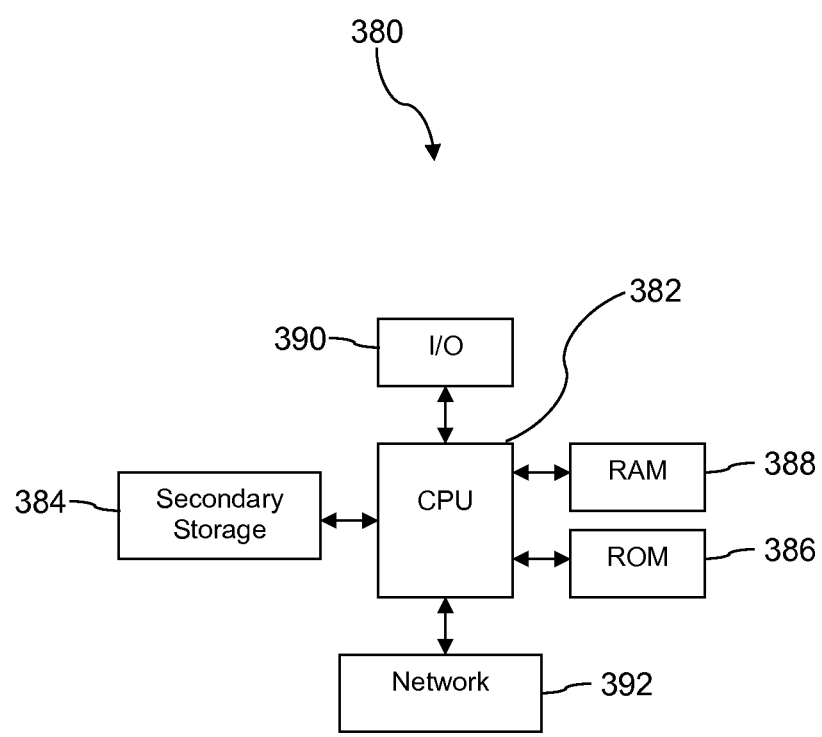
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of assigning a subscriber identifier to a mobile communication device using a long term evolution (LTE) network, comprising:
    searching an original service request, by a server, for a subscriber identifier of the mobile communication device upon receipt of the original service request comprising an original uniform resource locator (URL);
    determining, by the server, that no subscriber identifier is found and that a source internet protocol (IP) address of the original service request is within a predefined IP address block; and
    in response to the determining:
        composing, by the server, a new URL with the original URL nested inside the new URL, wherein the additional part of the new URL from the original URL redirects the mobile communication device to an identifier network element,
        responding to the original service request, by the server, to a client application on the mobile communication device with the new URL,
        referencing, by the identifier network element, a system of record (SoR) for a subscription profile based on a source IP address of a second service request in response to receiving the second service request from the mobile communication device,
        composing an enhanced header comprising a subscriber identifier obtained from the subscription profile,
        building a new service request comprising the enhanced header and the original service request, and
        submitting, by the identifier network element, the new service request to the server as a proxy of the client application.

2. The method of claim 1, wherein the requested service is provided to the mobile communication device after the new service request is submitted to the server by the identifier network element.

3. The method of claim 1, wherein the subscriber identifier is encrypted by the identifier network element and composed into the enhanced header.

4. The method of claim 1, wherein the service requests and responses are in the form of the hypertext transfer protocol (HTTP).

5. The method of claim 4, wherein the mobile communication device is HTTP compliant.

6. The method of claim 4, wherein the new URL is set by the server as a location field of an HTTP redirecting (302) response.

7. The method of claim 1, wherein the IP address of the original service request is within an IP address block for LTE clients.

8. The method of claim 1, wherein the identifier network element is assigned with a canonical name (CNAME) corresponding to the additional part of the new URL compared to the original URL, wherein the CNAME for the identifier network element is within the same sub-domain as the server.

9. A method of assigning a network access identifier to a mobile communication device using a long term evolution (LTE) network, comprising:
- searching a header of an original service request and a client cookie, by a server, for a network access identifier (NAI) of the mobile communication device upon receipt of the original service request comprising an original uniform resource locator (URL); and
- when no NAI is found and a source internet protocol (IP) address of the original service request is within a predefined IP address block:
    - composing, by the server, a new URL with the original URL nested inside the new URL, wherein the additional part of the new URL from the original URL redirects the mobile communication device to an identifier network element, and wherein the additional part of the new URL comprises a canonical name (CNAME) for the identifier network element,
    - responding to the original service request, by the server, to a client application on the mobile communication device with the new URL,
    - referencing, by the identifier network element, a system of record (SoR) for a subscription profile based on a source IP address of a second service request in response to receiving the second service request from the mobile communication device,
    - composing an enhanced header comprising an NAI obtained from the subscription profile,
    - building a new service request comprising the enhanced header and the original service request,
    - submitting, by the identifier network element, the new service request to the server as a proxy of the client application,
    - transmitting, by the server, a service response to the identifier network element comprising a client cookie after the server renders the service requested in the original service request based on the NAI of the mobile communication device, wherein the client cookie comprises the NAI,
    - forwarding, by the identifier network element, the service response from the server to the client application, and
    - rendering, by the server, a third service request from the client application based on the NAI comprised in the client cookie, wherein the third service request is received after forwarding the service response to the client application.

10. The method of claim 9, wherein the server computes a cookie identifier based on the subscriber identifier of the mobile communication device and embeds the cookie in the service response to the identifier network element.

11. The method of claim 9, wherein modification is made to a client software development kit (SDK) to build in persistence in client cookies and the client cookies provide targeting data on requests.

12. The method of claim 11, wherein a valid life time period for the client cookie is chosen based on the requested service.

13. The method of claim 9, wherein the subscriber identifier is encrypted by the identifier network element and composed as the enhanced header.

14. The method of claim 9, wherein the mobile communication device is one of a mobile phone, a personal digital assistant (PDA), a media player, a laptop computer, a tablet computer, a notebook computer, a wearable computer, or a headset computer.

15. The method of claim 9, wherein the mobile communication device establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

16. A method of assigning a subscriber identifier to a mobile communication device using a long term evolution (LTE) network, comprising:
- searching an original service request, by a server, for a subscriber identifier of the mobile communication device upon receipt of the original service request comprising an original uniform resource locator (URL);
- determining, by the server, that no subscriber identifier is found in the original service request and that a source internet protocol (IP) address of the original service request is within a predefined IP address block; and
- in response to the determining:
    - composing, by the server, a new URL with a portion of the original URL nested inside the new URL, wherein the additional part of the new URL from the original URL redirects the mobile communication device to an identifier network element,
    - responding to the original service request, by the server, to a client application on the mobile communication device with the new URL,
    - referencing, by the identifier network element, a system of record (SoR) for a subscription profile based on a source IP address of a second service request in response to receiving the second service request from the mobile communication device,
    - composing a name and value pair comprising a subscriber identifier obtained from the subscription profile,
    - composing a redirecting response comprising the name and value pair, wherein the redirecting response redirects the client application to the server, and
    - transmitting the redirecting response to the client application.

17. The method of claim 6, wherein the response from the server to the mobile communication device comprising the new URL and the redirecting response from the identifier network element are in the form of the hypertext transfer protocol secure (HTTPS) protocol.

18. The method of claim 17, wherein the redirecting response comprises the original URL and the name and value pair.

19. The method of claim 18, wherein the name and value pair is encrypted and appended to the original URL.

20. The method of claim 6, wherein the response from the server to the mobile communication device and the redirecting response from the identifier network element to the mobile communication device are encrypted.

* * * * *